US012031375B2

(12) United States Patent
Bruss

(10) Patent No.: US 12,031,375 B2
(45) Date of Patent: Jul. 9, 2024

(54) EMERGENCY BI-FOLD DOOR CLOSING PREVENTION SYSTEM

(71) Applicant: Aaron Bruss, Ames, IA (US)

(72) Inventor: Aaron Bruss, Ames, IA (US)

( * ) Notice: Subject to any disclaimer, the term of this patent is extended or adjusted under 35 U.S.C. 154(b) by 157 days.

(21) Appl. No.: 17/583,975

(22) Filed: Jan. 25, 2022

(65) Prior Publication Data

US 2023/0235606 A1 Jul. 27, 2023

(51) Int. Cl.

| | |
|---|---|
| ***E05F 5/00*** | (2017.01) |
| ***B65H 75/44*** | (2006.01) |
| ***E04H 6/44*** | (2006.01) |
| ***E06B 3/48*** | (2006.01) |
| *E06B 3/70* | (2006.01) |

(52) U.S. Cl.

CPC ........... *E05F 5/00* (2013.01); *B65H 75/4447* (2013.01); *E04H 6/44* (2013.01); *E06B 3/483* (2013.01); *E05Y 2201/21* (2013.01); *E05Y 2201/242* (2013.01); *E05Y 2201/26* (2013.01); *E05Y 2201/266* (2013.01); *E05Y 2600/45* (2013.01); *E05Y 2600/46* (2013.01); *E05Y 2900/108* (2013.01); *E06B 2003/7044* (2013.01)

(58) Field of Classification Search

CPC ........................... E06B 3/483; E05Y 2201/242

See application file for complete search history.

(56) References Cited

U.S. PATENT DOCUMENTS

| | | | | |
|---|---|---|---|---|
| 3,207,208 A * | 9/1965 | Houk | E05F 15/605 160/189 |
| 4,838,333 A * | 6/1989 | Mottura | E06B 9/80 192/12 B |
| 5,109,503 A | 4/1992 | Cruickshank et al. | |
| 5,186,289 A * | 2/1993 | Wolner | F16D 59/00 188/65.1 |
| 5,743,320 A | 4/1998 | McKeon | |
| 6,059,008 A | 5/2000 | Yoshida | |
| 6,199,617 B1 * | 3/2001 | Schweiss | E05F 15/605 242/584.1 |
| 8,807,294 B2 | 8/2014 | Hsich | |
| 9,376,864 B2 | 6/2016 | Hsich | |
| 9,861,841 B1 * | 1/2018 | Hung | A62B 1/10 |
| 10,391,339 B2 * | 8/2019 | Sun | A62B 35/0093 |
| 10,392,849 B2 | 8/2019 | Xiao | |
| 10,413,761 B2 * | 9/2019 | Hetrich | A62B 1/08 |
| 10,676,991 B2 | 6/2020 | Hsich | |

(Continued)

*Primary Examiner* — Gregory J Strimbu
*Assistant Examiner* — Patrick B. Ponciano

(57) ABSTRACT

An emergency bi-fold door closing prevention system includes a building having an access opening with an upper edge. A bi-fold door is hingedly mounted to the building wall and includes a plurality of panels each being laterally elongated. The plurality of panels includes a bottom panel having a bottom edge that is positionable adjacent to a floor surface to define a closed position. A safety line assembly is attached to and extends between the building wall adjacent to the upper edge and the bi-fold door adjacent to the bottom edge. The safety line has an extendable length. The length of the safety line assembly extends when the bi-fold door moves toward the closed position below a threshold velocity. The length of the safety line assembly is inhibited from extending when the bi-fold door moves toward the closed position above the threshold velocity.

10 Claims, 8 Drawing Sheets

(56) References Cited

U.S. PATENT DOCUMENTS

| | | | | |
|---|---|---|---|---|
| 11,633,634 | B2 * | 4/2023 | Harding | A62B 35/0018 702/41 |
| 2009/0178887 | A1 * | 7/2009 | Reeves | A62B 1/10 182/239 |
| 2017/0089134 | A1 * | 3/2017 | Hsieh | F16D 65/22 |
| 2018/0283084 | A1 * | 10/2018 | Schweiss | E05F 15/605 |
| 2018/0333598 | A1 * | 11/2018 | Hung | A62B 35/0093 |

* cited by examiner

EMERGENCY BI-FOLD DOOR CLOSING PREVENTION SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to a bi-fold door falling prevention device and more particularly pertains to a new bi-fold door falling prevention device for stopping the free fall of a bi-fold door should its lifting and lowering mechanisms fail. Such failures can lead to critical injuries to persons upon whom a bi-fold door may fall as well as damage to property such as planes, when the bi-fold door is an airplane hangar door, positioned under the bi-fold door.

(2) Description of Related Art Including Information Disclosed Under 37 CFR 1.97 and 1.98

The prior art relates to bi-fold door falling prevention devices which are incorporated within the lifting/lowering mechanisms of bi-fold doors. These devices can be used to control the speed of free fall of a bi-fold door, but suffer from a lack of usefulness in some cases should there be a loss of electrical power and others where there is a complete mechanical failure of the lifting mechanism itself. Therefore, the need exists for a retrofittable device that can be added to bi-fold doors which are independent of lifting mechanisms.

(h) BRIEF SUMMARY OF THE INVENTION

An embodiment of the disclosure meets the needs presented above by generally comprising an access opening for a building. The access opening has an upper edge and a pair of lateral edges. A bi-fold door is hingedly mounted to the building wall and includes a plurality of panels each being laterally elongated. The panels are hingedly coupled together and are foldable with respect to each other. The plurality of panels includes a bottom panel having a bottom edge that is positioned adjacent to a floor surface to define a closed position and is positioned adjacent to the upper edge to define an open position. A safety line assembly is attached to and extends between the building wall adjacent to the upper edge and the bi-fold door adjacent to the bottom edge. The safety line has an extendable length. The length of the safety line assembly extends when the bi-fold door moves toward the closed position below a threshold velocity. The length of the safety line assembly is inhibited from extending when the bi-fold door moves toward the closed position above the threshold velocity to prevent unimpeded falling of the bi-fold door.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
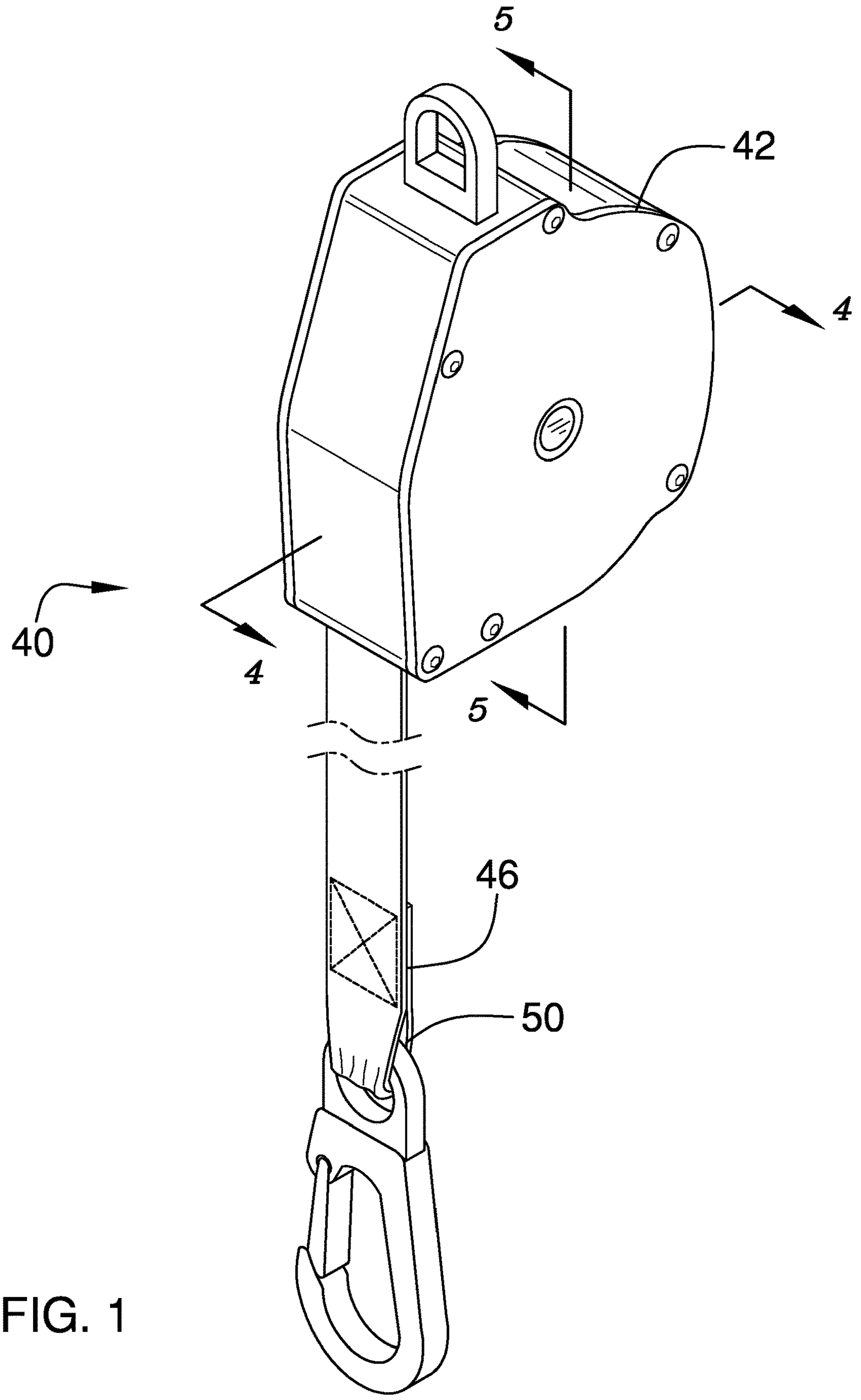
FIG. 1 is a front isometric view of a safety line assembly of an emergency bi-fold door closing prevention system according to an embodiment of the disclosure.
Figure 2:
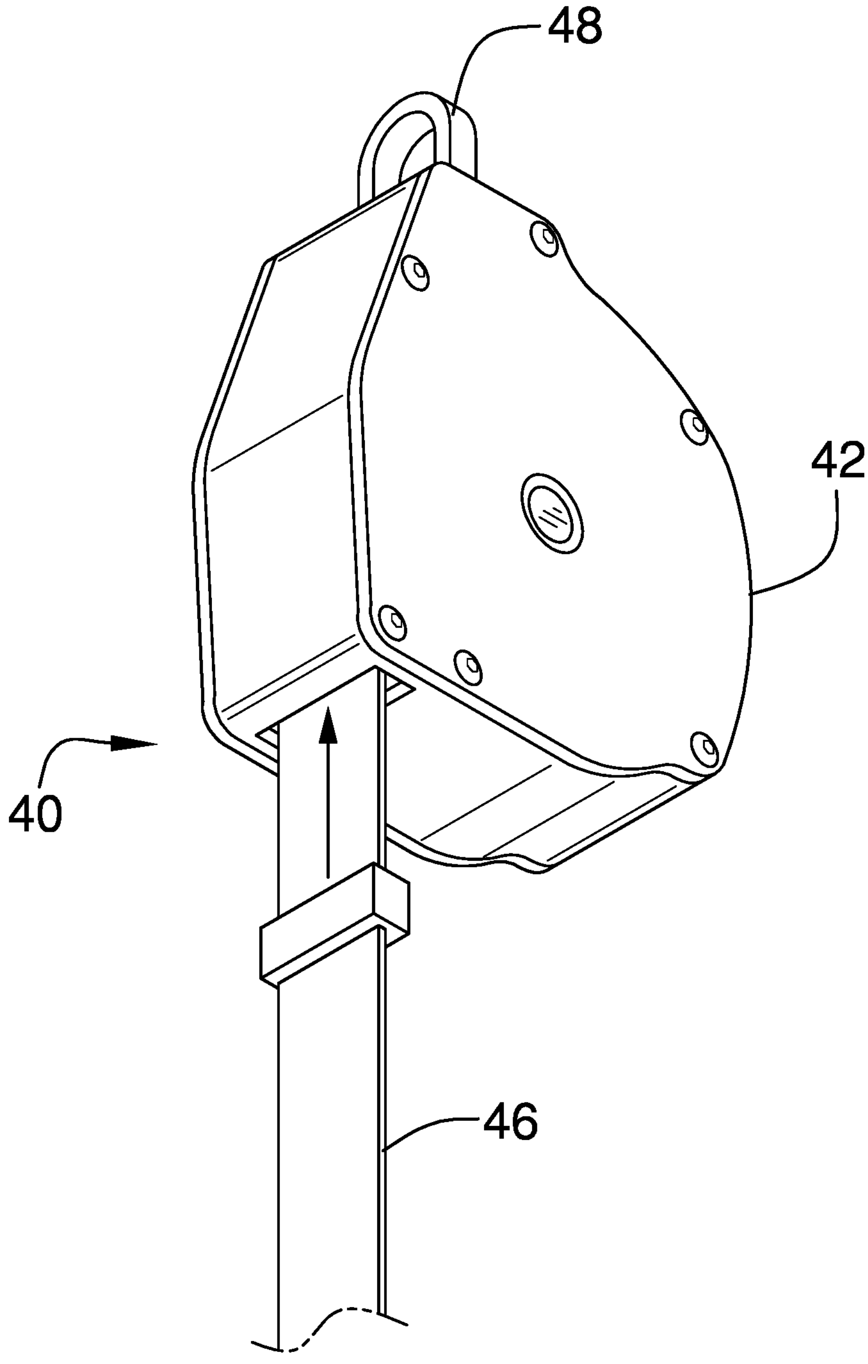
FIG. 2 is a bottom front view of the safety line assembly an embodiment of the disclosure.

With reference now to the drawings, and in particular to FIGS. 1 through 7 thereof, a new bi-fold door falling prevention device embodying the principles and concepts of an embodiment of the disclosure and generally designated by the reference numeral 10 will be described.

As best illustrated in FIGS. 1 through 7, the emergency bi-fold door closing prevention system 10 generally comprises a building wall 12 of a conventional building that has an access opening 14 therein for accommodating a plane. Typically, the building 14 may comprise an airplane hangar. The access opening 14 has an upper edge 16 and a pair of lateral edges 18. A bi-fold door 20 of conventional construction is hingedly mounted to the building wall 12. In some common embodiments, bi-fold doors 20 typically include a plurality of panels 22 each being laterally elongated. The panels 22 are hingedly coupled together and are foldable with respect to each other. The plurality of panels 22 includes a bottom panel 24 having a bottom edge 26 that is positionable adjacent to a floor surface 28 to define a closed position and conversely is positionable adjacent to the upper edge 16 to define an open position.

Bi-fold doors 20 are most often moved between the open and closed positions using one or more lines 30 which are usually attached to winch-type or a spindle driven mechanisms utilizing one or more electric motors. Chain driven systems, typically mounted along rails in which the bi-fold door 20 is mounted may also be used. Alternatively, pistons utilizing electric pumps can also be used for this function. The exact type of electrical driven opening and closing mechanism utilized for the bi-fold door 20 is not specifically connected to the subject matter of this specification. The lines 30 may include metallic cables, woven straps, and the like. Failure of the lines 30, chains, pistons or their electric motors can cause the bi-fold door 20 to free-fall toward the closed position.

A safety line assembly 40 is attached to and extends between the building wall 12 adjacent to the upper edge 16 and the bi-fold door 20 adjacent to the bottom edge 26. The safety line assembly 40 has an adjustable and extendable length to allow it to shorten when the bi-fold door in the open position and extend as the bi-fold door 20 moves to the closed position. More specifically, the length of the safety line assembly 40 is extendable when the bi-fold door 20 moves toward the closed position below a threshold velocity and the length of the safety line assembly 40 retracts when the bi-fold door moves 20 toward the open position.

However, the safety line assembly 40 is configured such that the length of the safety line assembly 40 is inhibited from extending when the bi-fold door 20, and more specifically the bottom edge 26 of the bi-fold door 20, moves toward the closed position above the threshold velocity to prevent the falling of the bi-fold door 20 in an un-controlled manner. This inhibiting will prevent unimpeded falling of the bi-fold door 20. The threshold velocity may vary depending on the size and construction of the bi-fold door 20, however, the threshold velocity will include velocities greater than 2.0 miles per hour. Since the average speed of a closing bi-fold door 20 is typically less than 1 foot per second, the threshold speed may be as low as 1.0 mile per hour, though, again, the threshold speed may be determined depending upon up the particular circumstances in which the system 10 is used.

Figure 7:
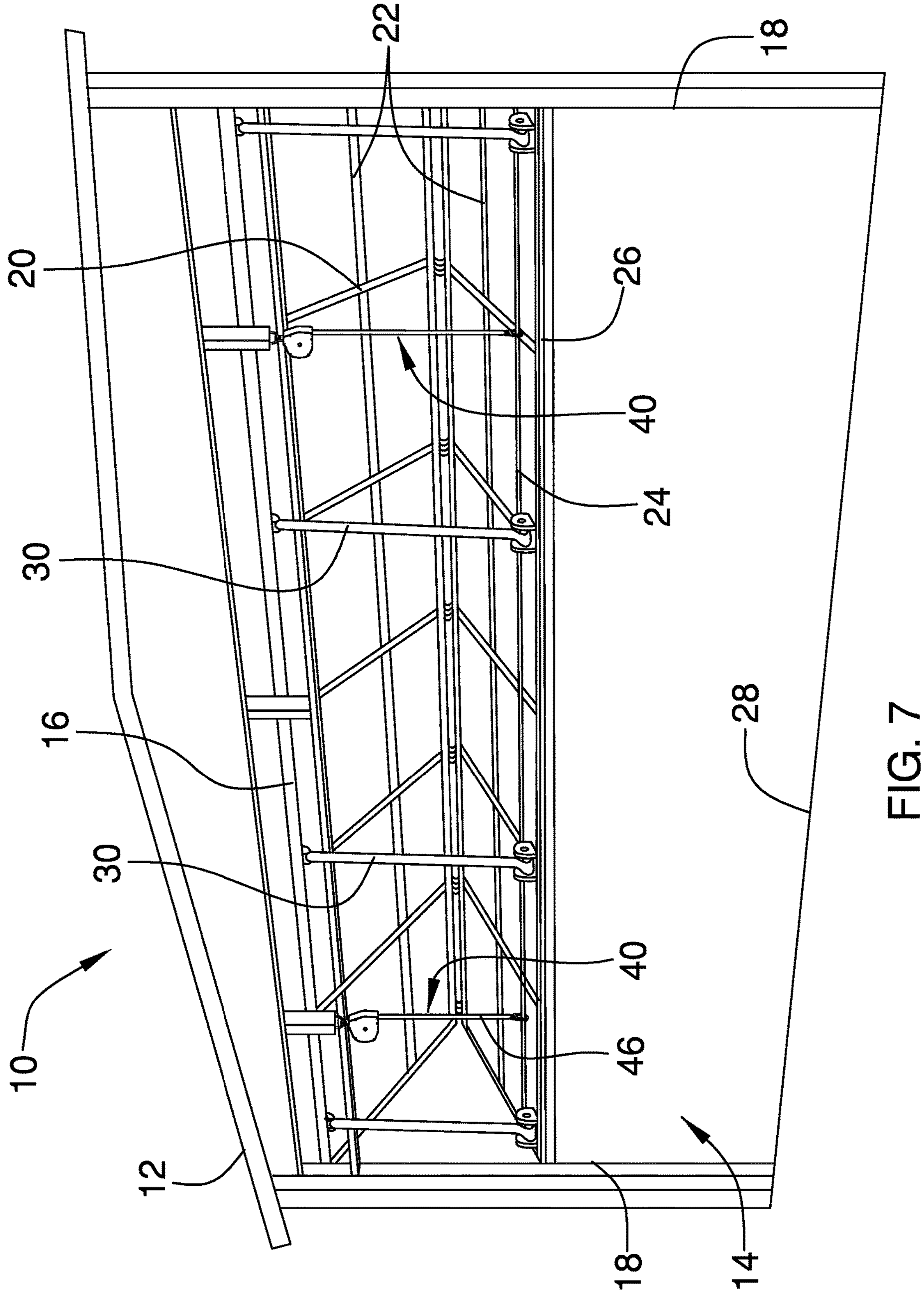
FIG. 7 is an isometric in-use view of an embodiment of the disclosure.
Figure 8:
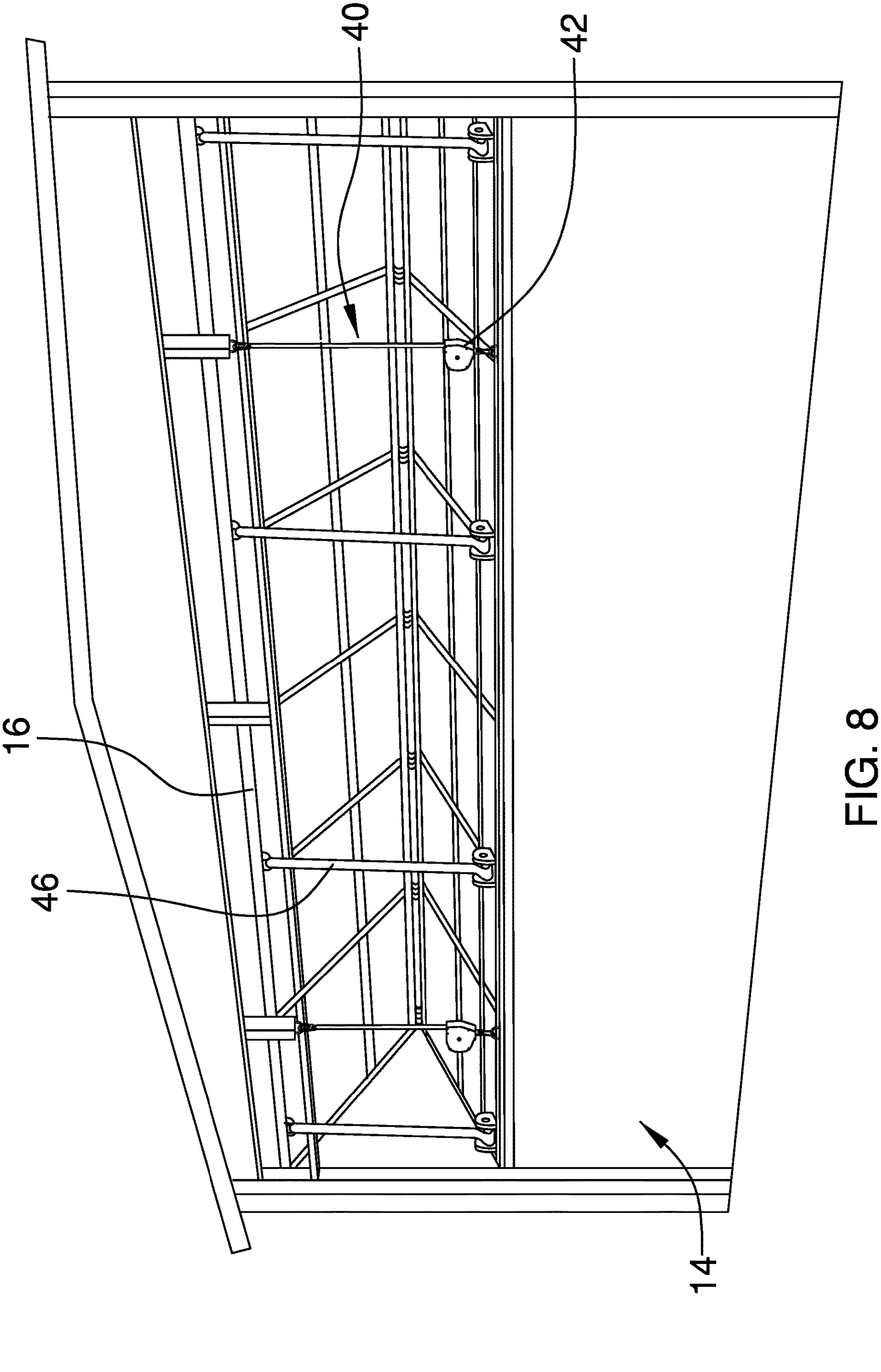
FIG. 8 is an isometric in-use view of another embodiment of the disclosure.

In one embodiment, the safety line assembly 40 comprises housing 42 containing a rotatable reel 44. A tether 46 is releasably wound upon the reel 44, wherein the reel 44 rotates in a first direction to unwind the tether 46 from the reel 44 and in a second direction to wind the tether onto the reel 44. The tether 46 will most often comprise woven strap material or a metallic cable having a rating equal to at least 4 times the weight of the bi-fold door 20. As can be seen in FIG. 7, the system 10 may include a plurality of safety line assemblies 40. The housing 42 and its contained reel 44 are typically mounted to the building wall 12 adjacent to the top edge 16. However, as shown in FIG. 8, this orientation may be reversed with the housing 42 instead being mounted on the bi-fold door 20 adjacent to its bottom edge 26 while the tether 46 is attached to the building wall 12.

The attachments to the building wall 12 and the bi-fold door 20 described above and shown in the Figures may be accomplished in any conventional manner. In one embodiment, for example, the housing 42 is attached to the building wall 12 with a conventional hook engaged to a loop 48 mounted to the housing 42 and a loop attached to the building wall 12, though the housing 42 may instead be directly attached to the building wall 12 or its loop 48 directly engaging a loop attached to the building wall 12. The tether 46 has a distal end 50 relative to the reel 44 which is attached to the bi-fold door 20 by way of any conventional connection such as a hook, loop, or carabiner.

Figure 3:
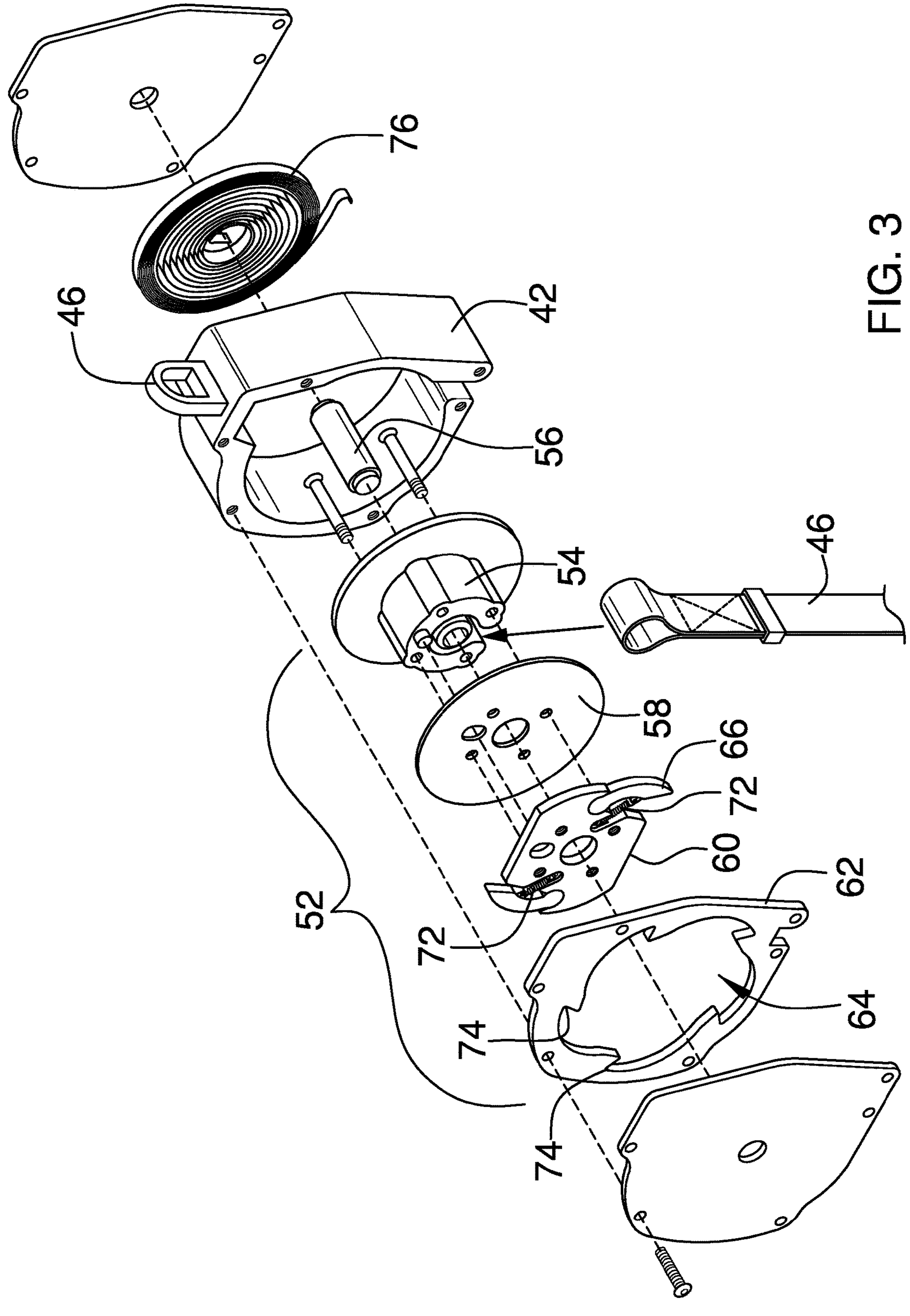
FIG. 3 is an isometric exploded view of the safety line assembly of an embodiment of the disclosure.
Figure 4:
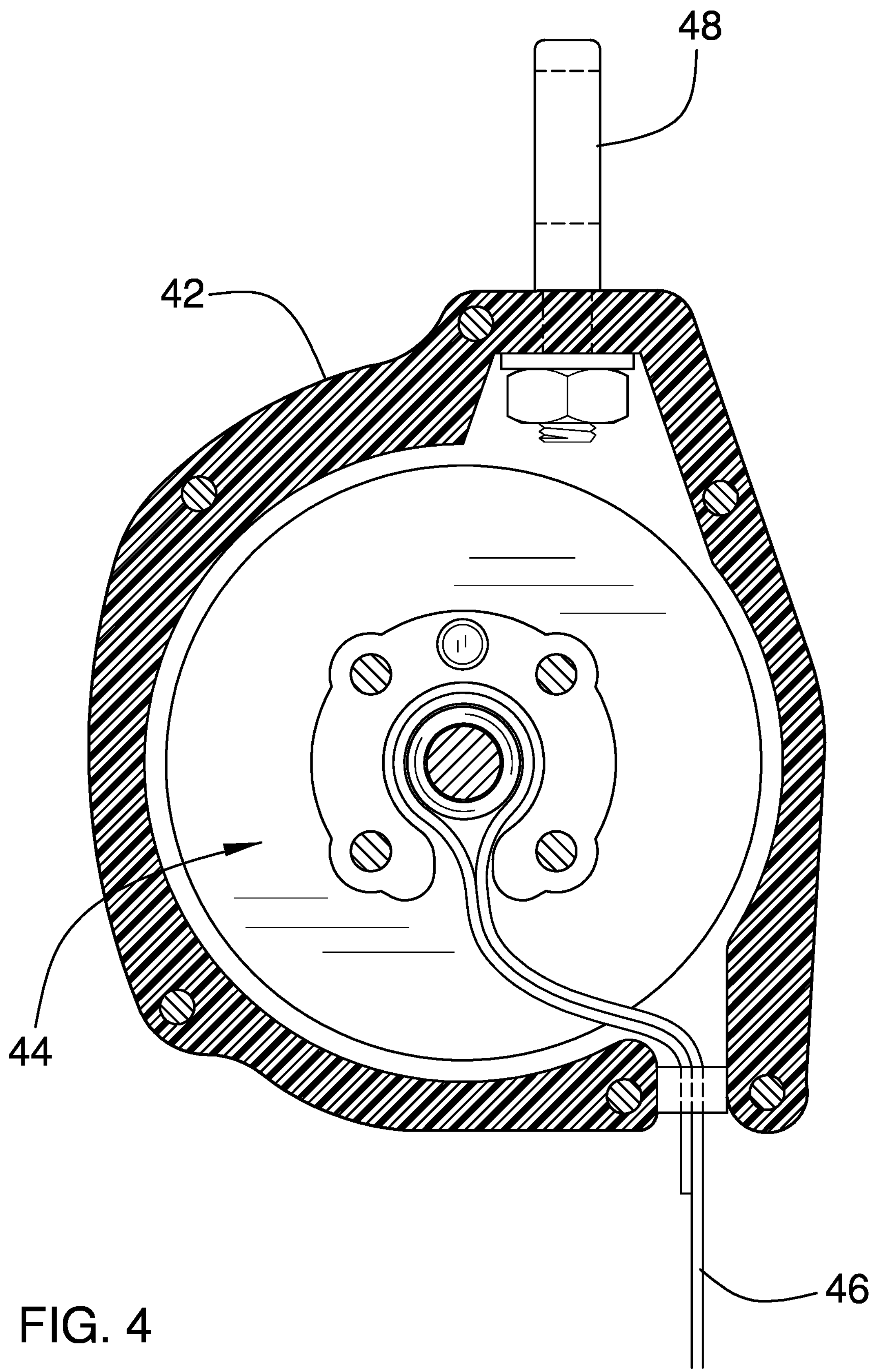
FIG. 4 is a cross-sectional view of an embodiment of the disclosure taken along line 4-4 of FIG. 1.
Figure 5:
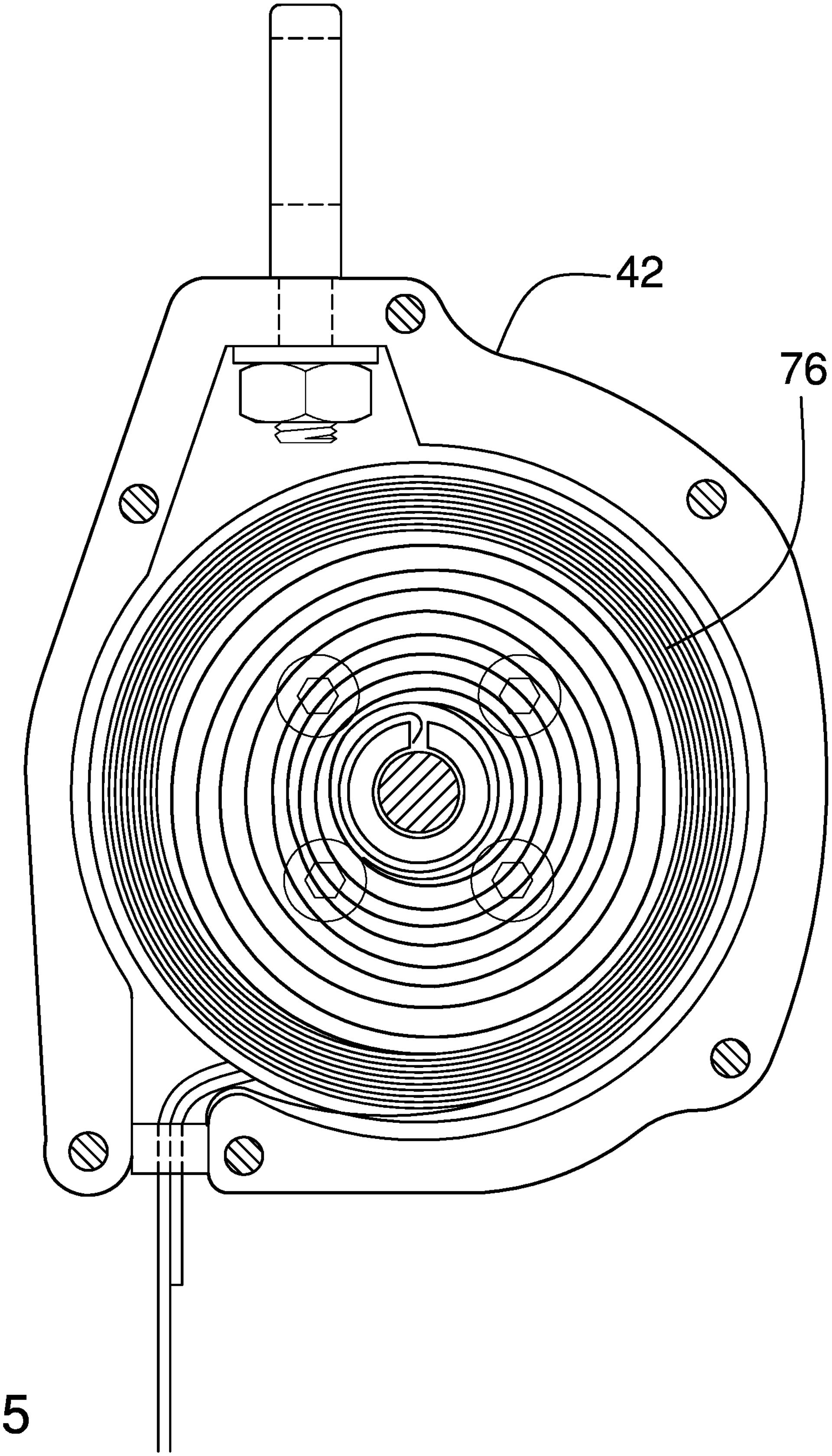
FIG. 5 is a cross-sectional view of an embodiment of the disclosure taken along line 5-5 of FIG. 1.
Figure 6:
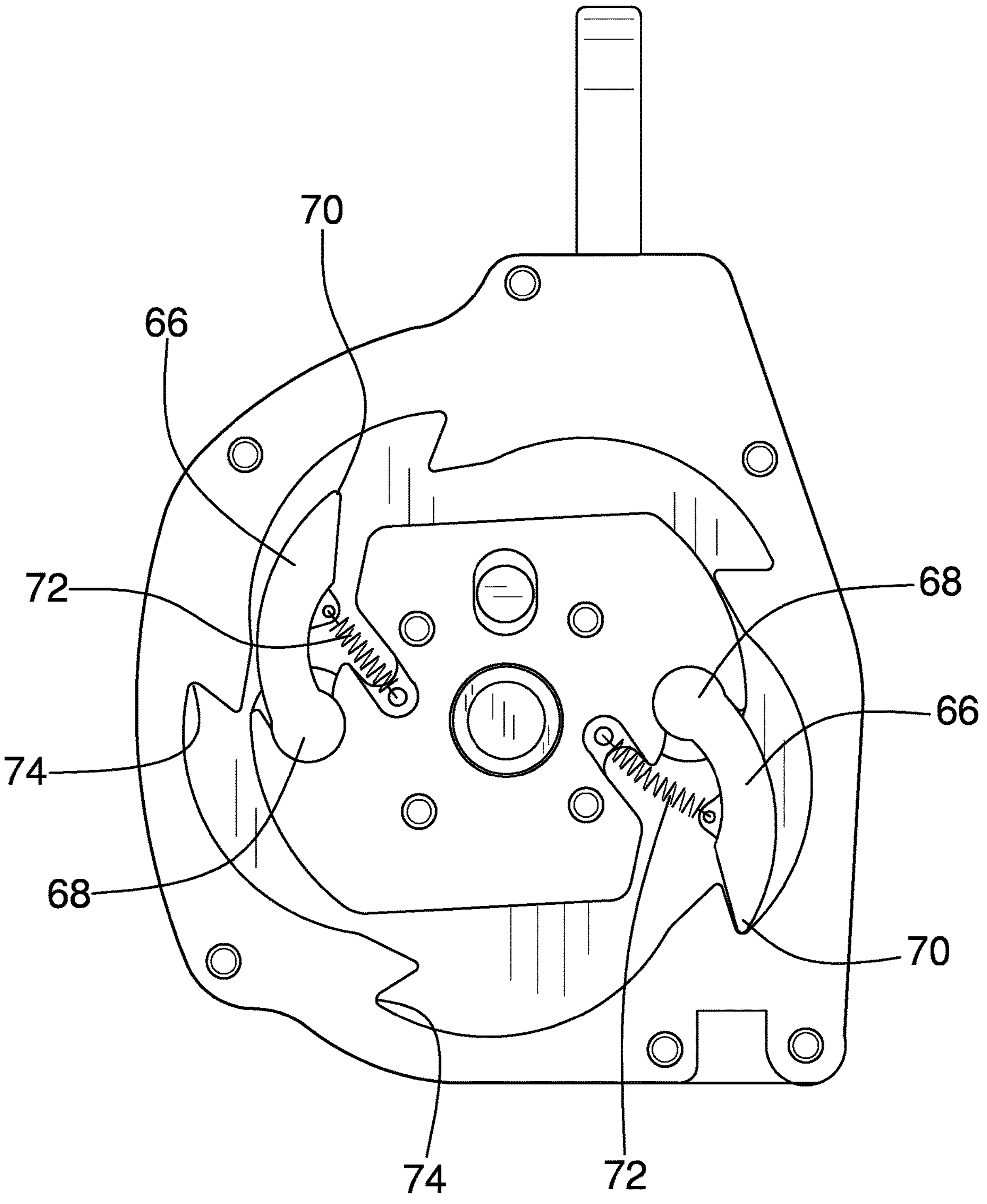
FIG. 6 is a an open view of an embodiment of the disclosure showing an interior in a locked position of the safety line assembly.

In one embodiment, the reel 44 includes a centrifugal force stop 52 configured to restrict rotation of the reel 44 in the first direction when the reel 44 is rotated in the first direction in response to the bi-fold door 20 moving toward the closed position above the threshold velocity. The centrifugal force stop 52 is a mechanical and preferably a non-electrically powered assembly to avoid failure should a source of electrical power become unavailable. More particularly, in one embodiment, a drum 54 is used for engaging the tether 46 and is rotatably mounted on an axle 56. To the drum 54 is attached an outer wall 58 and a lobe plate 60 is mounted to the outer wall 58 such that the outer wall 58 and the lobe plate 60 rotate with the drum 54. On the housing 42 is mounted a tooth plate 62 and that is fixed relative to the housing 42. The lobe plate 60 rotates within an aperture 64 in the tooth plate 62. One or more lobes 66 are pivotally coupled to the lobe plate 60. The lobes 66 include an attached end 68 and a free end 70. Biasing members 72, such as springs, pull the free ends 70 toward the lobe plate 60 as is shown in FIGS. 3 and 6. When the drum 54 rotates in the first direction beyond the threshold velocity, the centrifugal force exerted on the free ends 70 causes the lobes 66 to pivot outwardly as shown in FIG. 6 and engage one of a plurality of receivers 74 in the tooth plate 62. Once one or more of the lobes 66 engages one or more of the receivers 74, the drum 54 stops rotating and the tether 46 cannot unwind further from the drum 54. This action in turn prevents the bi-fold door 20 from moving toward the closed position.

It should be understood that the Figures show only one type of centrifugal type stop 52 and that other types of non-powered, mechanical stopping mechanisms may be utilized which are driven, primarily, by centrifugal forces exerted on components of the reel 44 when the tether 46 is unwound by the bi-fold door 20 falling beyond the threshold velocity.

As can be seen in FIG. 3, the reel 44 further may include a coil spring 76 attached to the drum 54 to urge rotation of the drum 54 in the second direction to wind the tether back 46 onto the drum 54 when the bi-fold door 20 moves toward the open position. When rotating in the second direction, the receivers 74, due to their shape, cannot engage the lobes 66 to ensure that the drum 54 will freely rotate in the second direction.

In use, one or more safety line assemblies 40 is secured between the bi-fold door 20 and the building wall 12, though the safety line assemblies 40 may also be attached to and extended between two of the panels 22 of the bi-fold door 20. In the event that the raising and lowering device of the bi-fold door 20 fails and allows the bi-fold door 20 to freely fall towards the closed position, the safety line assemblies 40 will arrest the bi-fold door's 20 fall.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bi-fold door safety braking system comprising:

a building wall having an access opening therein for accommodating a plane, the access opening having an upper edge and a pair of lateral edges;

a bi-fold door being hingedly mounted to the building wall, the bi-fold door including a plurality of panels each being laterally elongated, the panels being hingedly coupled together and being foldable with respect to each other, the plurality of panels including a bottom panel having a bottom edge, the bottom edge configured to be positioned adjacent to a floor surface to define a closed position and being positioned adjacent to the upper edge to define an open position; and a safety line assembly being attached directly to the building wall and extending between the building wall adjacent to the upper edge and the bi-fold door adjacent to the bottom edge, the safety line assembly having an extendable length, the length of the safety line assembly being extendable when the bi-fold door moves toward the closed position below a threshold velocity, the length of the safety line assembly being inhibited from extending when the bi-fold door moves toward the closed position above the threshold velocity to prevent unimpeded falling of the bi-fold door.

2. The bi-fold door safety braking system according to claim 1, wherein the length of the safety line assembly retracts when the bi-fold door moves toward the open position.

3. The bi-fold door safety braking system according to claim 2, wherein the safety line assembly comprises:

a reel; and a tether being releasably wound upon the reel, the reel rotating in a first direction to unwind the tether from the reel, the reel rotating in a second direction to wind the tether onto the reel.

4. The bi-fold door safety braking system according to claim 3, wherein the reel includes a centrifugal force stop configured to restrict rotation of the reel in the first direction when the reel is rotating in the first direction in response to the bi-fold door moving toward the closed position above the threshold velocity.

5. The bi-fold door safety braking system according to claim 4, wherein the threshold velocity includes velocities at least greater than 2.0 miles per hour.

6. The bi-fold door safety braking system according to claim 3, wherein the tether has a distal end relative to the reel being attached to the bi-fold door.

7. The bi-fold door safety braking system according to claim 6, wherein the reel is mounted to the building wall adjacent to the upper edge.

8. The bi-fold door safety braking system according to claim 6, wherein the reel includes a centrifugal force stop configured to restrict rotation of the reel in the first direction when the reel is rotating in the first direction in response to the bi-fold door moving toward the closed position above the threshold velocity.

9. The bi-fold door safety braking system according to claim 8, wherein the threshold velocity includes velocities at least greater than 2.0 miles per hour.

10. The bi-fold door safety braking system according to claim 1, wherein the threshold velocity includes velocities at least greater than 2.0 miles per hour.

* * * * *